US011411669B2

United States Patent
Liu et al.

(10) Patent No.: US 11,411,669 B2
(45) Date of Patent: Aug. 9, 2022

(54) METHOD FOR ESTABLISHING DATA MODEL AND APPARATUS

(71) Applicant: Huawei Technologies Co., Ltd., Shenzhen (CN)

(72) Inventors: Xin Liu, Dongguan (CN); Li Kuang, Dongguan (CN); Haoyu Feng, Dongguan (CN); Lvchuan Zhang, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/179,735

(22) Filed: Feb. 19, 2021

(65) Prior Publication Data

US 2021/0175993 A1 Jun. 10, 2021

Related U.S. Application Data

(63) Continuation of application No. PCT/CN2018/101395, filed on Aug. 20, 2018.

(51) Int. Cl.
*H04B 10/27* (2013.01)
*H04J 14/02* (2006.01)
(Continued)

(52) U.S. Cl.
CPC ............ *H04J 14/021* (2013.01); *G06N 3/04* (2013.01); *G06N 3/08* (2013.01); *H04B 10/07953* (2013.01); *H04B 10/07955* (2013.01); *H04B 10/07957* (2013.01); *H04B 10/25* (2013.01); *H04B 10/27* (2013.01)

(58) Field of Classification Search
CPC ........ H04B 10/07953; H04B 10/07955; H04B 10/07957; H04B 10/27; H04J 14/021
See application file for complete search history.

(56) References Cited

U.S. PATENT DOCUMENTS

| 6,144,486 A | 11/2000 | Bennett et al. |
| 2003/0099014 A1 | 5/2003 | Egner et al. |

(Continued)

FOREIGN PATENT DOCUMENTS

| CN | 1492619 A | 4/2004 |
| CN | 101145838 A | 3/2008 |

(Continued)

OTHER PUBLICATIONS

Infinera Corporation, "Evolving TheAwareness of Optical Networks," White Paper, 2019, 11 pages.
(Continued)

*Primary Examiner* — Dzung D Tran
(74) *Attorney, Agent, or Firm* — Conley Rose, P.C.

(57) ABSTRACT

A method for establishing a data model and an apparatus, where a network element may create an optical signal group that includes optical signals with different wavelengths. After selecting a first optical signal group and obtaining first data of the first optical signal group, the network element may reflect, based on a first model established based on the first data of the first optical signal group, a noise coefficient and a gain that are obtained after an optical signal in the optical signal group of different wavelength combinations passes through the network element.

20 Claims, 7 Drawing Sheets

(51) Int. Cl.
    *G06N 3/04*     (2006.01)
    *G06N 3/08*     (2006.01)
    *H04B 10/079*     (2013.01)
    *H04B 10/25*     (2013.01)

(56) References Cited

U.S. PATENT DOCUMENTS

| | | | |
|---|---|---|---|
| 2006/0028712 A1* | 2/2006 | Ohtsuki | H01S 3/06708 359/337 |
| 2014/0022626 A1 | 1/2014 | Eliyahu et al. | |
| 2014/0079389 A1* | 3/2014 | Han | H04L 45/62 398/26 |
| 2018/0123724 A1* | 5/2018 | Zhang | H04J 14/0271 |
| 2018/0248905 A1* | 8/2018 | Cote | G06F 17/18 |
| 2019/0109638 A1* | 4/2019 | Yilmaz | H04B 10/27 |

FOREIGN PATENT DOCUMENTS

| | | |
|---|---|---|
| CN | 103580754 A | 2/2014 |
| CN | 105281827 A | 1/2016 |
| CN | 106788708 A | 5/2017 |
| EP | 2654221 A1 | 10/2013 |
| EP | 2706708 A2 | 3/2014 |
| WO | 2013055548 A2 | 4/2013 |

OTHER PUBLICATIONS

Nokia, "Cognitive Analytics in Digital Time," Pathfinder Report, Jan. 2018, 12 pages.
"Series G: Transmission Systems and Media, Digital Systems and Networks, Transmission media characteristics, Characteristics of optical components and subsystems Spectral grids for WDM applications: CWDM wavelength grid," ITU-T G.694.2, Dec. 2003, 12 pages.
"Series G: Transmission Systems and Media, Digital Systems and Networks, Transmission media and optical systems characteristics—Characteristics of optical systems Spectral grids for WDM applications: DWDM frequency grid," ITU-T G.694.1, Feb. 2012, 16 pages.
Ciena, "WaveLogic Ai: Laying the Foundation for the Adaptive Network," Application Note, 2020, 3 pages.
Fei, Y., "Research on SNR Reduction Due to Optical Signal Bit Error in DWDM System," Radio and TV Broadcast Engineering, 2017, Issue 04, 3 pages.

* cited by examiner

METHOD FOR ESTABLISHING DATA MODEL AND APPARATUS

CROSS-REFERENCE TO RELATED APPLICATIONS

This application is a continuation of International Patent Application No. PCT/CN2018/101395, filed on Aug. 20, 2018, the disclosure of which is hereby incorporated by reference in its entirety.

TECHNICAL FIELD

This application relates to the field of communications technologies, and in particular, to a method for establishing a data model and an apparatus.

BACKGROUND

Dense wavelength-division multiplexing (DWDM) means that a group of optical signals with different wavelengths can be simultaneously transmitted in one optical fiber. A DWDM technology is a laser technology that can increase a bandwidth in an existing optical network. Simply, the DWDM technology can enable multiplexing of a compact optical spectrum spacing of a single optical carrier in a specified optical fiber, to achieve specific transmission performance (for example, achieve minimum dispersion or attenuation). Use of the DWDM technology can reduce a quantity of required optical fibers as much as possible for a given information transmission capacity.

Detection on performance of an optical channel for transmitting an optical signal of a DWDM system is a key issue for implementing effective optical signal transmission. With universal deployment of reconfigurable optical add-drop multiplexers (ROADMs) in the DWDM system and wide use of a network topology structure in the DWDM system, there may be a plurality of alternative paths for optical signal transmission in the DWDM system. A gain and a noise figure (NF) of a specific optical signal vary in different optical signal groups. Therefore, an optical signal-to-noise ratio (OSNR) of the optical signal in the entire DWDM system varies in the different optical signal groups. Currently, the gain and the NF of the optical signal are preset in each network element in the DWDM system. An OSNR parameter that is of the optical signal in the entire DWDM system and that is calculated based on the preset gain and NF cannot accurately reflect a property of the optical signal.

In conclusion, the preset gain and NF in the DWDM system in other approaches are of poor accuracy.

SUMMARY

This application provides a method for establishing a data model and an apparatus, to resolve a problem in other approaches of poor accuracy of a preset gain and NF in a DWDM system.

According to a first aspect, an embodiment of this application provides a method for establishing a data model. In the method, first, a network element may create an optical signal group. The optical signal group needs to include an optical signal with at least one wavelength. After creating the optical signal group, the network element may select one or more first optical signal groups from the optical signal group based on a preset rule. Subsequently, the network element may obtain first data of the one or more first optical signal groups. For example, the first data includes input optical power and an input optical signal-to-noise ratio of each optical signal that are obtained before the first optical signal group is input into the network element and output optical power and an output optical signal-to-noise ratio of each optical signal that are obtained after the first optical signal group passes through the network element. The network element then establishes a first model for the network element based on the first data of the first optical signal group. The first model is used to determine a noise coefficient and a gain that are obtained after the optical signal passes through the network element.

According to the method, the network element may create an optical signal group that includes optical signals with different wavelengths, in other words, an optical signal group of different wavelength combinations. After selecting the first optical signal group and obtaining the first data of the first optical signal group, the network element may reflect, based on the first model established based on the first data of the first optical signal group, a noise coefficient and a gain that are obtained after an optical signal in the optical signal group of different wavelength combinations passes through the network element. For the noise coefficient and the gain that are obtained after the optical signal passes through the network element and that are determined using the first model, the optical signal group of different wavelength combinations is comprehensively considered, such that the determined noise coefficient and gain can be more accurate.

In a possible design, if the network element includes an optical amplifier, the network element may adjust multiplexed wavelength optical power of the optical signal group using the optical amplifier. For example, when the network element selects the first optical signal group from the optical signal group based on the preset rule, the network element may perform first adjustment based on a first attenuation parameter corresponding to the optical signal group, to obtain the first optical signal group. The first adjustment is adjusting, based on the first attenuation parameter, multiplexed wavelength optical power that is obtained before the optical signal group is input into the optical amplifier.

According to the method, the network element may select the first optical signal group by adjusting the multiplexed wavelength optical power that is obtained before the optical signal group is input into the optical amplifier, to obtain a first optical signal group having different multiplexed wavelength optical power. Further, first data of the first optical signal group at different multiplexed wavelength optical power may be obtained. As such, the first model that is established based on the first data of the first optical signal group is applicable to more scenarios. This can also ensure higher accuracy of the noise coefficient and the gain that are determined using the first model.

In a possible design, when the network element selects the first optical signal group from the optical signal group based on the preset rule, the network element may add one or more optical signals with specific wavelengths to the optical signal group, to obtain the first optical signal group. Alternatively, the network element may drop one or more optical signals with specific wavelengths from the optical signal group, to obtain the first optical signal group. Alternatively, the network element may add one or more optical signals with specific wavelengths to the optical signal group and also drop one or more optical signals with specific wavelengths from the optical signal group, to obtain the first optical signal group.

According to the method, the network element may obtain different first optical signal groups by adjusting wavelength combinations and a quantity of optical signals in the optical signal group, such that the wavelength combinations and the quantity of optical signals in the first optical signal group can flexibly change. Further, first data of the first optical signal group with different wavelength combinations and different quantities of optical signals can be obtained, such that the first model established based on the first data of the first optical signal group is applicable to different scenarios, and the noise coefficient and the gain can be more accurately determined using the first model.

In a possible design, if the network element includes a ROADM, and the ROADM is connected to the optical amplifier, the network element may adjust single-wavelength optical power of any optical signal in the optical signal group using the ROADM, and before the network element obtains the first data of the first optical signal group, the network element may perform second adjustment based on a second attenuation parameter corresponding to any optical signal in the first optical signal group. The second adjustment is adjusting, based on the second attenuation parameter of the optical signal, single-wavelength optical power that is obtained before the optical signal is input into the ROADM.

According to the method, the network element may obtain different first optical signal groups by adjusting single-wavelength optical power of one or more optical signals in the optical signal group, such that single-wavelength optical power of any optical signal in the first optical signal group can be conveniently changed. Further, first data of the first optical signal group with different combinations of optical signal single-wavelength optical power can be obtained, such that the first model that is established based on the first data of the first optical signal group is applicable to different optical signal groups, and the noise coefficient and the gain that are determined using the first model are more accurate.

In a possible design, if the network element includes the ROADM, the ROADM causes an optical signal of the first optical signal group to produce a frequency offset, and a frequency offset of the ROADM may be determined. First, the network element obtains second data of the first optical signal group. The second data includes an optical spectrum that is obtained before the first optical signal group is input into the ROADM and an optical spectrum that is obtained after the first optical signal group passes through the ROADM. Subsequently, the network element determines the frequency offset of the ROADM based on the second data of the first optical signal group.

According to the method, because the frequency offset of the ROADM affects a gain and a noise coefficient of an optical signal in the network element, the network element can more accurately determine the noise coefficient and the gain of the optical signal based on the frequency offset of the ROADM using the first model.

In a possible design, the network element may establish the first model using the following steps.

First, the network element establishes a second model based on the first data of the first optical signal group and based on a preset learning algorithm, where the second model is used to determine output optical power and an output optical signal-to-noise ratio that are obtained after the optical signal passes through the network element.

Subsequently, the network element converts an output value of the second model based on a first relationship and a second relationship, to obtain the first model, where the first relationship is a relationship between input optical power of the optical signal and the output optical power and the gain that are of the optical signal, and the second relationship is a relationship between an input optical signal-to-noise ratio of the optical signal and the output optical signal-to-noise ratio and the noise coefficient that are of the optical signal.

According to the method, the second model can specify relationships between input optical power and an input optical signal-to-noise ratio of each optical signal in the optical signal group of different wavelength combinations and output optical power and an output optical signal-to-noise ratio of each optical signal in the optical signal group. Subsequently, the second model is converted into the first model based on relationships between the input optical power, the input optical signal-to-noise ratio, the output optical power, and the output optical signal-to-noise ratio that are of the optical signal and a gain and a noise coefficient that are of the optical signal. An establishment process is simpler and more convenient, and efficiency of establishing the first model can be improved.

In a possible design, after establishing the first model for the network element, the network element may update the first model in real time. The network element may obtain updated first data of the first optical signal group. Subsequently, the network element adjusts the second model based on the updated first data of the first optical signal group, and updates the first model based on the adjusted second model.

According to the method, the network element can update the first model, thereby ensuring that the first model can more accurately determine the gain and the noise coefficient.

In a possible design, after establishing the first model for the network element, the network element may share the first model, for example, share the first model with another network element or a software-defined networking (SDN) controller having a same attribute as the network element. In other words, the network element may send information about the first model to the other network element or the SDN controller.

According to the method, the network element may share the first model, and the other network element does not need to locally establish the first model, such that efficiency can be effectively improved, and resources can be saved. In addition, the network element shares the first model with the other network element or the SDN controller, such that the other network element or the SDN controller can more accurately determine the gain and the noise coefficient of the optical signal based on the first model.

According to a second aspect, an embodiment of this application further provides an apparatus. The apparatus provided in this application has a function of implementing behavior of the network element in the first aspect. For beneficial effects, refer to the description of the first aspect. Details are not described herein again. The function may be implemented by hardware, or by hardware executing corresponding software. The hardware or the software includes one or more modules corresponding to the foregoing function. In a possible design, a structure of the apparatus includes a creation unit, a selection unit, an obtaining unit, and a processing unit, and may further include a transmission unit. These units may perform corresponding functions in an example of the method in the first aspect. For details, refer to detailed descriptions in the example of the method. Details are not described herein again.

According to a third aspect, an embodiment of this application further provides an apparatus. The apparatus provided in this application has a function of implementing behavior of the network element in the first aspect. For beneficial effects, refer to the description of the first aspect. Details are not described herein again. A structure of the apparatus includes a processor and a memory. The processor is configured to support the network element in performing a corresponding function in the method in the first aspect. The memory is coupled to the processor, and stores a program instruction and data that are necessary for the apparatus. The structure of the apparatus further includes a communications interface, configured to communicate with another device.

According to a fourth aspect, this application further provides a computer-readable storage medium. The computer-readable storage medium stores an instruction. When the instruction is run on a computer, the computer performs the method according to the first aspect.

According to a fifth aspect, this application further provides a computer program product including an instruction. When the computer program product is run on a computer, the computer performs the method according to the first aspect.

According to a sixth aspect, this application further provides a computer chip. The chip is connected to a memory. The chip is configured to read and execute a software program stored in the memory, to perform the method in the first aspect.

DESCRIPTION OF EMBODIMENTS

The embodiments of this application provide a method for establishing a data model and an apparatus, to resolve a problem in other approaches of poor accuracy of a preset gain and NF in a DWDM system.

Figure 1:
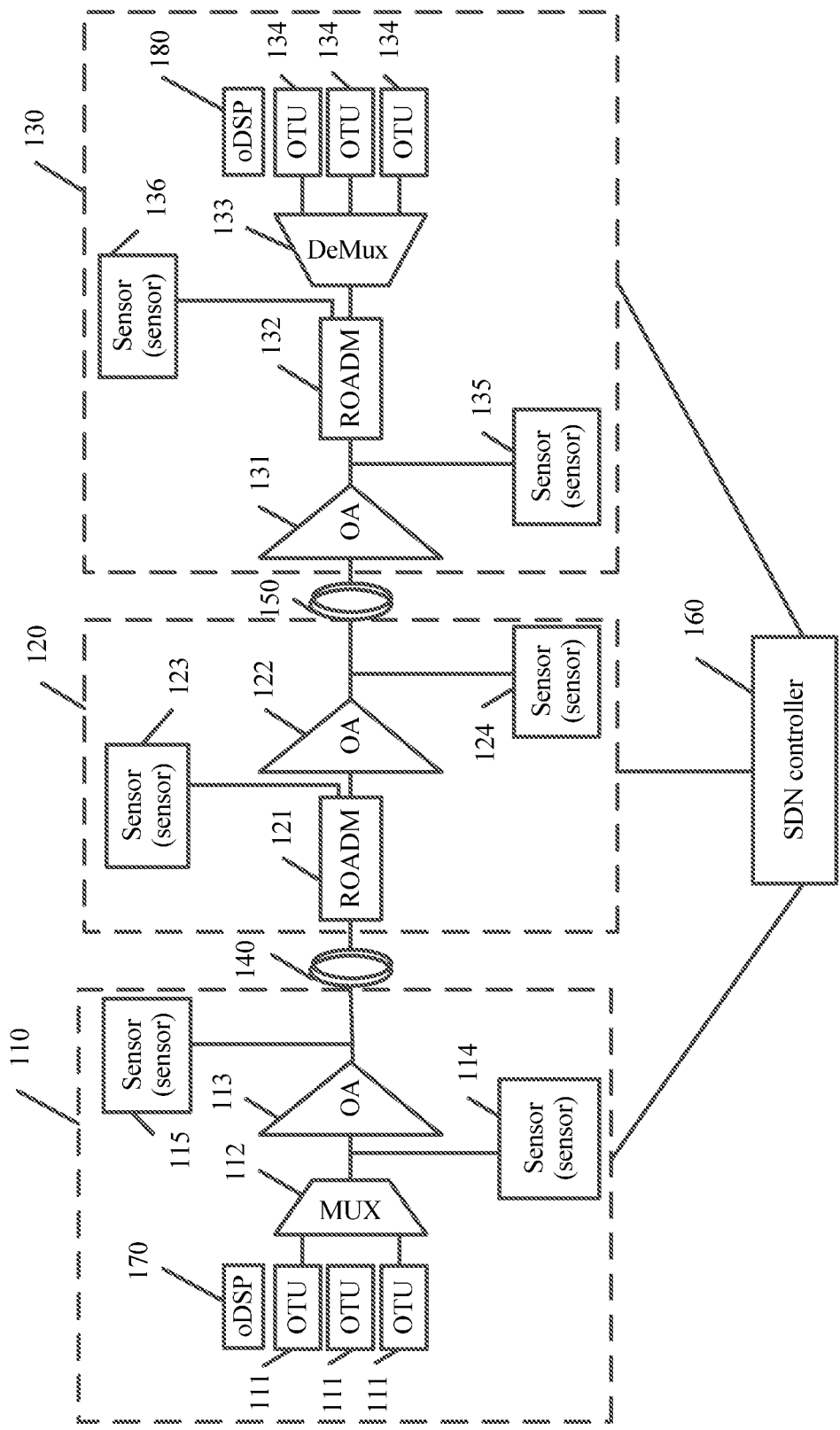
FIG. 1 is an architectural diagram of an optical network system according to an embodiment of this application.

FIG. 1 is a schematic structural diagram of an optical network system according to an embodiment of this application. The optical network system may be a DWDM system, or may be another optical network system. This is not limited in this application. The optical network system includes a plurality of network elements. The network elements in the optical network system are at different locations in the optical network system. Components included in the network elements are also different. The optical network system shown in FIG. 1 includes, for example, three network elements (namely, a network element 110, a network element 120, and a network element 130). Actually, a quantity of network elements included in the optical network system is not limited in this embodiment of this application.

In addition, the network elements in the optical network system may further form different network topologies. The optical network system shown in FIG. 1 is merely a relatively simple structure. During actual application, a network topology of the optical network system may be a tree-based topology, or may be another topology.

As shown in FIG. 1, the optical network system includes the network element 110, the network element 120, and the network element 130. The network element 110 includes three optical transform units (OTUs) 111, a wavelength division multiplexer (MUX) 112, and an optical amplifier (OA) 113. The network element 110 may further include a sensor 114 and a sensor 115. The OTU 111 is configured to convert an electrical signal into an optical signal that conforms to a regulation. For example, the OTU 111 may convert an electrical signal into an optical signal that conforms to a regulation in G.694.1/G.694.2 and that can be used for wavelength division multiplexing. The MUX 112 is configured to implement wavelength division multiplexing, and combine a plurality of different optical signals into a multi-wavelength optical signal. The OA 113 is configured to amplify an input optical signal. The sensor 114 is configured to detect optical power and an optical signal-to-noise ratio of an optical signal before the optical signal enters the OA 113. The sensor 115 is configured to detect optical power and an optical signal-to-noise ratio of an optical signal after the optical signal passes through the OA 113.

The network element 120 includes a reconfigurable optical add/drop multiplexer (ROADM) 121 and an OA 122. The network element may further include a sensor 123 and a sensor 124. The ROADM 121 is configured to separate a single-wavelength optical signal from a multi-wavelength optical signal, or to add a single-wavelength optical signal to a multi-wavelength optical signal. The OA 122 is configured to amplify an optical signal output by the ROADM 121. The sensor 123 is configured to detect optical power and an optical signal-to-noise ratio of an optical signal before the optical signal enters the OA 122, in other words, detect optical power and an optical signal-to-noise ratio of an optical signal after the optical signal passes through the ROADM 121. The sensor 124 is configured to detect optical power and an optical signal-to-noise ratio of an optical signal after the optical signal passes through the OA 122.

The network element 130 includes an OA 131 and a ROADM 132, a wavelength division demultiplexer (DeMux) 133, and three OTUs 134. The network element may further include a sensor 135 and a sensor 136. The OA 131 is configured to amplify an optical signal output by the network element 130. The ROADM 132 is configured to separate a single-wavelength optical signal from a multi-wavelength optical signal, or to add a single-wavelength optical signal to a multi-wavelength optical signal. The DeMux 133 is configured to implement demultiplexing, and demultiplex a multi-wavelength optical signal into a plurality of different optical signals. The OTU 134 is configured to convert an optical signal into an electrical signal that conforms to a regulation. The sensor 135 is configured to detect optical power and an optical signal-to-noise ratio of an optical signal after the optical signal passes through the OA 131, in other words, detect optical power and an optical signal-to-noise ratio of an optical signal before the optical signal enters the ROADM 132. The sensor 136 is configured to detect optical power and an optical signal-to-noise ratio of an optical signal after the optical signal passes through the ROADM 132.

The network elements may be connected using an optical fiber. For example, the network element 110 and the network element 120 are connected using an optical fiber 140, and the network element 120 and the network element 130 are connected using an optical fiber 150.

The optical network system may further include a software-defined networking (SDN) controller 160, an optical digital signal processing (oDSP) module 170 located at a signal input end of the DWDM system, and an oDSP module 180 located at a signal output end of the DWDM system. The SDN controller 160 may obtain data detected by the sensors in each network element, and create a first model for each network element. The oDSP module 170 is configured to modulate an electrical signal into an optical signal, in other words, to perform modulation. The oDSP module 180 is configured to restore an optical signal into an electrical signal, in other words, to perform demodulation.

The following describes a flow direction of an optical signal in the optical network system shown in FIG. 1.

First, an electrical signal enters the network element 110 from the signal input end of the optical network system. In the network element 110, the electrical signal is converted into a gray light signal using the OTU 111, and the gray light signal carries electrical noise, as a result of an action of the OTU 111. The plurality of OTUs 111 output gray light signals with different wavelengths. The gray light signals with the different wavelengths output by the plurality of OTUs 111 are input into the MUX 112 for multiplexing. The MUX 112 outputs a multiplexed wavelength optical signal.

An optical splitter may separate some signals from the multiplexed wavelength optical signal output by the MUX 112 and input the signals into the sensor 114. The sensor 114 detects optical power and an optical signal-to-noise ratio of each optical signal in the multiplexed wavelength optical signal before the multiplexed wavelength optical signal is input into the OA 113. The multiplexed wavelength optical signal is input into the OA 113, and is amplified in the OA 113. Amplified spontaneous emission (ASE) noise is introduced into the multiplexed wavelength optical signal, as a result of an action of the OA 113. Subsequently, the optical splitter separates some signals from the multiplexed wavelength optical signal output by the OA 113 and inputs the signals into the sensor 115. The sensor 115 detects optical power and an optical signal-to-noise ratio of each optical signal in the multiplexed wavelength optical signal after the multiplexed wavelength optical signal passes through the OA 113.

To detect a length of the optical fiber 140 between the network element 110 and the network element 120, the sensor 115 may send a sounding optical signal. The sounding optical signal sent by the sensor 115 and the multiplexed wavelength optical signal output by the OA 113 are jointly input into the ROADM 121 in the network element 120 through the optical fiber 140. The ROADM 121 may filter the optical signals input into the ROADM 121. Nonlinear optical damage may be introduced, as a result of an action of the optical fiber 140. A filtering function of the ROADM 121 causes a particular signal frequency offset. The optical splitter may separate some signals from the multiplexed wavelength optical signal output by the ROADM 121 and the sounding optical signal, and input the signals into the sensor 123. The sensor 123 may detect optical power and an optical signal-to-noise ratio of each optical signal in the multiplexed wavelength optical signal after the multiplexed wavelength optical signal passes through the ROADM 121, an optical spectrum of the multiplexed wavelength optical signal, and a change in the sounding optical signal. A frequency offset of the ROADM 121 may be obtained through calculation by comparing and analyzing optical spectrums of the multiplexed wavelength optical signals detected by the sensor 115 and the sensor 123. The length of the optical fiber 140 may be obtained based on the change in the sounding optical signal.

The multiplexed wavelength optical signal output by the ROADM 121 is input into the OA 122, and is amplified in the OA 122. The optical splitter may separate some signals from the multiplexed wavelength optical signal output by the OA 122 and input the signals into the sensor 124. The sensor 124 may detect optical power and an optical signal-to-noise ratio of each optical signal in the multiplexed wavelength optical signal output by the OA 122.

To detect a length of the optical fiber 150 between the network element 120 and the network element 130, the sensor 124 may send a sounding optical signal. The sounding optical signal sent by the sensor 124 and the multiplexed wavelength optical signal output by the OA 122 are jointly input into the OA 131 in the network element 130 through the optical fiber 150. The OA 131 amplifies the signals input into the OA 131. The optical splitter may split the signals output by the OA 131 and input the split signals into the sensor 135. The sensor 135 may detect a change in the sounding optical signal that may be sent by the sensor 124 and an optical spectrum of the multiplexed wavelength optical signal. The length of the optical fiber 150 is obtained based on the change in the sounding optical signal that may be sent by the sensor 124.

The ROADM 132 may filter the optical signals output by the OA 131. The optical splitter may split the multiplexed wavelength optical signal output by the ROADM 132 and input the split multiplexed wavelength optical signal into the sensor 136. The sensor 136 may detect optical power and an optical signal-to-noise ratio of each optical signal in the multiplexed wavelength optical signal output by the ROADM 132. The multiplexed wavelength optical signal output by the ROADM 132 is demultiplexed by the DeMux 133. The demultiplexed optical signal is input into the OTU 134 corresponding to a wavelength. The OTU 134 may convert the optical signal into an electrical signal. The oDSP module 180 may read an uncorrected bit error rate of a service corresponding to each optical signal.

It should be noted that, the components included in each network element are merely an example. In application, the components included in the network element may be disposed based on a specific scenario. For example, the network element may include only an OA, or may include only a ROADM. The sensors included in the network element may be disposed at different locations to detect optical power and an optical signal-to-noise ratio of an optical signal. A quantity of sensors included in the network element is not limited in this embodiment of this application.

In other approaches, a parameter such as an OSNR of an optical signal in the entire optical network system needs to be detected. Calculation of the OSNR is used as an example. When an OSNR of an optical signal needs to be measured, calculation usually needs to be performed based on a gain and an NF that are preset in an OA included in each network element through which the optical signal passes. For example, the calculation may be performed according to the following formula:

$$OSNR = 58 - 10\text{Log}\left(\sum_{i}^{N} \frac{L_i NF_i}{P_i^{in}}\right)$$

where N is a quantity of network elements through which the optical signal passes, $L_i$ is optical damage introduced by an optical fiber connected to an $i^{th}$ network element, $P_i^{in}$ is input optical power of the optical signal before the optical signal enters the $i^{th}$ network element, and $NF_i$ is a noise coefficient preset in an OA in the $i^{th}$ network element.

Although the preset gain is not represented in the formula, an OA included in a network element amplifies the optical signal. Optical power of the optical signal after the optical signal passes through the network element may be determined based on the preset gain. In other words, input optical power of the optical signal when the optical signal enters a next network element is affected.

The gain and the NF that are preset in the OA included in each network element are fixed values. During actual application, when an optical signal with a specific wavelength is located in an optical signal group with different wavelength combinations, a value of an OSNR of the optical signal with the specific wavelength is also different. In this case, when a parameter such as the OSNR is calculated based only on the specified gain and NF, a property of the optical signal cannot be truly reflected. In other words, the specified gain and NF in the optical network system are of poor accuracy.

Figure 2:
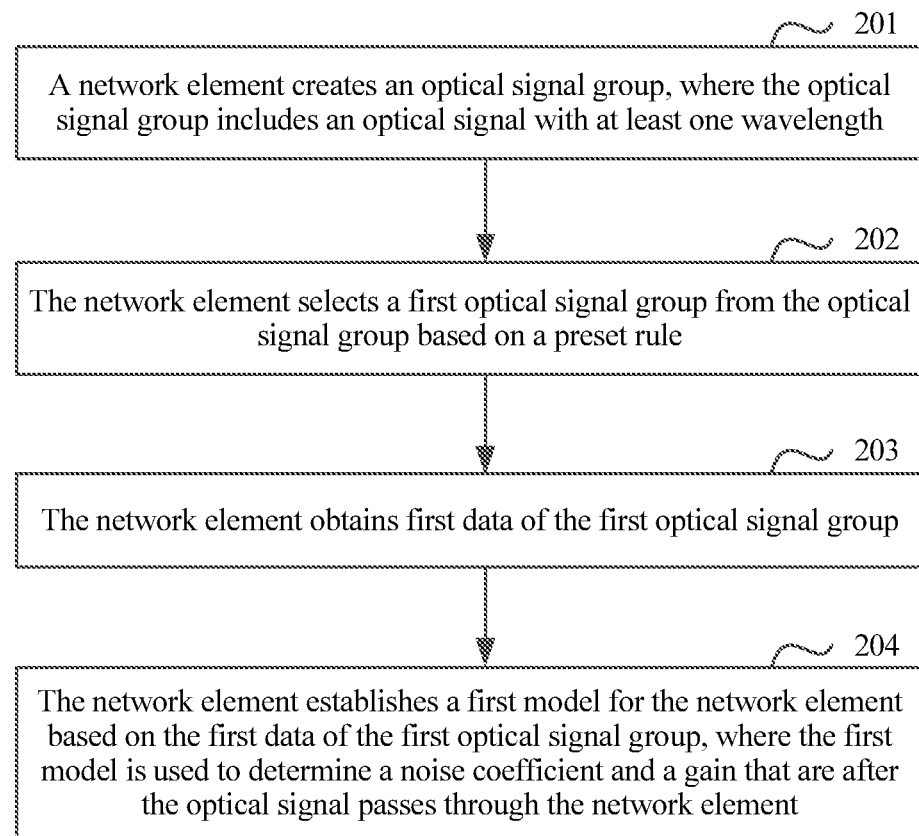
FIG. 2 is a flowchart of establishing a data model according to an embodiment of this application.

Based on the optical network system shown in FIG. 1, an embodiment of this application provides a method for establishing a data model. As shown in FIG. 2, the method includes the following steps.

Step 201: A network element creates an optical signal group, where the optical signal group includes an optical signal with at least one wavelength.

When the network element creates the optical signal group, the network element may receive an instruction sent by another network element or an SDN controller, or the network element may directly create the optical signal group.

In a possible implementation, a network element corresponding to a first node in the optical network system has a path calculation function. After obtaining a path through calculation based on a preset path algorithm, the network element corresponding to the first node may send an optical signal group creation instruction to another network element on the path. The optical signal group creation instruction may include wavelength information of each optical signal in the optical signal group. After receiving the optical signal group creation instruction, the other network element on the path creates the optical signal group according to the optical signal group creation instruction. The network element corresponding to the first node may directly create the optical signal group.

In another possible implementation, the SDN controller having a path calculation function may perform a path calculation operation, and subsequently, send an optical signal group creation instruction to each network element on a path obtained through calculation. The optical signal group creation instruction may include wavelength information of each optical signal in the optical signal group. After receiving the optical signal group creation instruction, each network element on the path obtained through calculation creates the optical signal group according to the optical signal group creation instruction.

It should be noted that, regardless of whether the network element corresponding to the first node performs the path calculation operation, or the SDN controller performs the path calculation operation, there are various path calculation manners. This is not limited in this embodiment of this application.

Figure 3A:
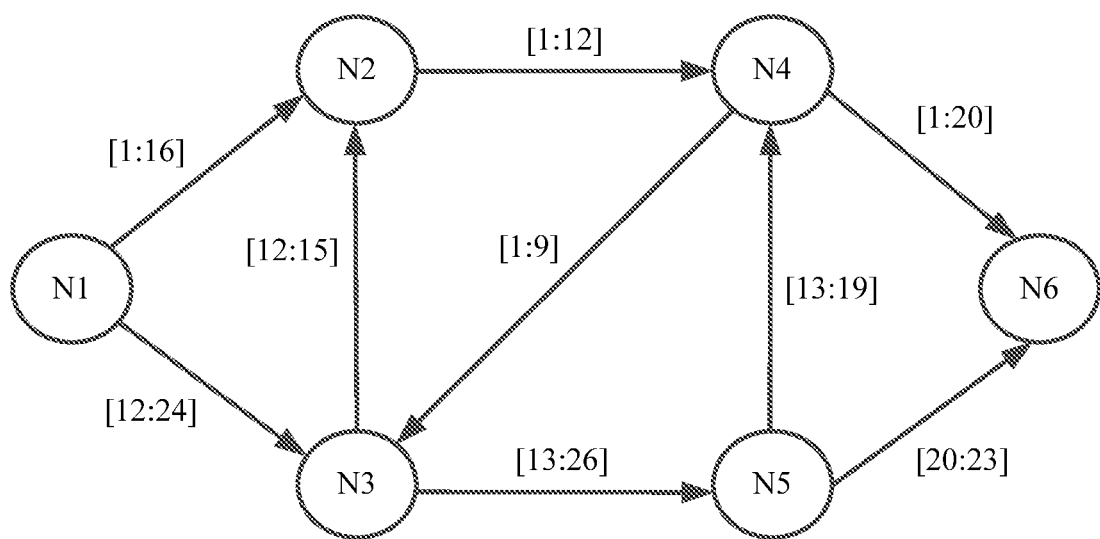
FIG. 3A is a schematic diagram of a topological structure of an optical network system according to an embodiment of this application.

Wavelengths of optical signals that can be transmitted between the network elements in the optical network system are different. As shown in FIG. 3A, N1 to N6 are six network elements in the network topology of the optical network system. A wavelength of an optical signal that can be transmitted between the network elements is indicated by [m:n]. [m:n] indicates that an optical signal with a wavelength falling within a range of a number m to a number n can be transmitted. For example, optical signals with a wavelength 1 to a wavelength 16 can be transmitted between N1 and N2.

When the first node or the SDN controller in the optical network system calculates a path, the first node or the SDN controller may determine a maximum flow path of an optical signal with each wavelength based on the network topology of the optical network system according to a wavelength consistency principle. The wavelength consistency principle means that an optical signal with a wavelength may pass through each network element on the path. The maximum flow path is a path on which a maximum transmission amount of the optical signal can be ensured.

As shown in FIG. 3A, if N1 is the network element corresponding to the first node, N1 may first perform route flooding through open shortest path first (OSPF), to obtain the network topology of the optical network system, and based on the wavelength consistency principle, may determine that maximum flow paths of the wavelengths are separately shown in FIG. 3B to FIG. 3E.

Subsequently, N1 may create an optical signal group, and establish the maximum flow paths shown in FIG. 3B to FIG. 3E using a resource reservation protocol (RSVP).

Establishment of one path is used as an example for description. N1 sends path information to a neighboring network element along the path. After receiving the path information, the neighboring network element forwards the path information to a downstream network element based on the path information, until the path information is forwarded to a last network element on the path. After receiving the path information, the last network element on the path sends a response message to an upstream network element backwards. After N1 receives the response message, it indicates that the path has been established.

Figure 3B:
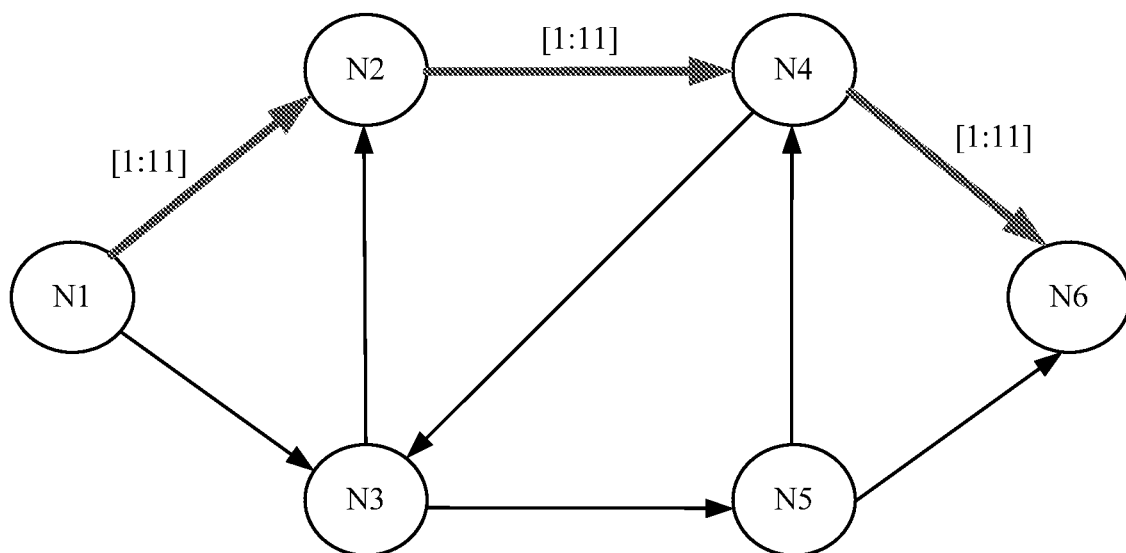
FIG. 3B to FIG. 3E are schematic diagrams of a maximum flow path of an optical network system according to an embodiment of this application.

As shown in FIG. 3B, an established maximum flow path is N1→N2→N4→N6, and a wavelength range of optical signals that can be transmitted is the wavelength 1 to the wavelength 11.

Figure 3C:
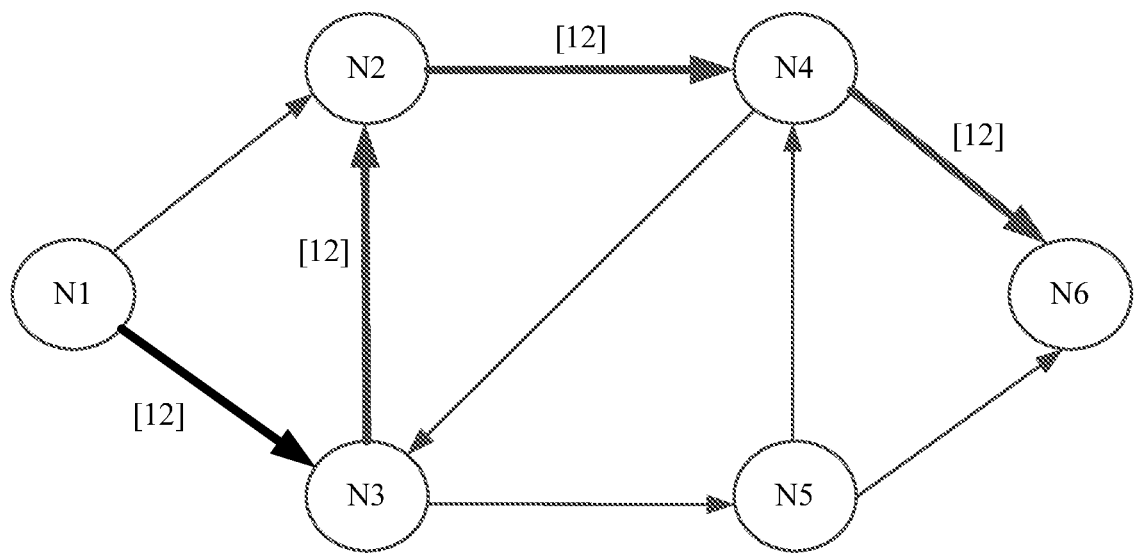

As shown in FIG. 3C, an established maximum flow path is N1→N3→N2→N4→N6, and a wavelength range of an optical signal that can be transmitted is the wavelength 12.

Figure 3D:
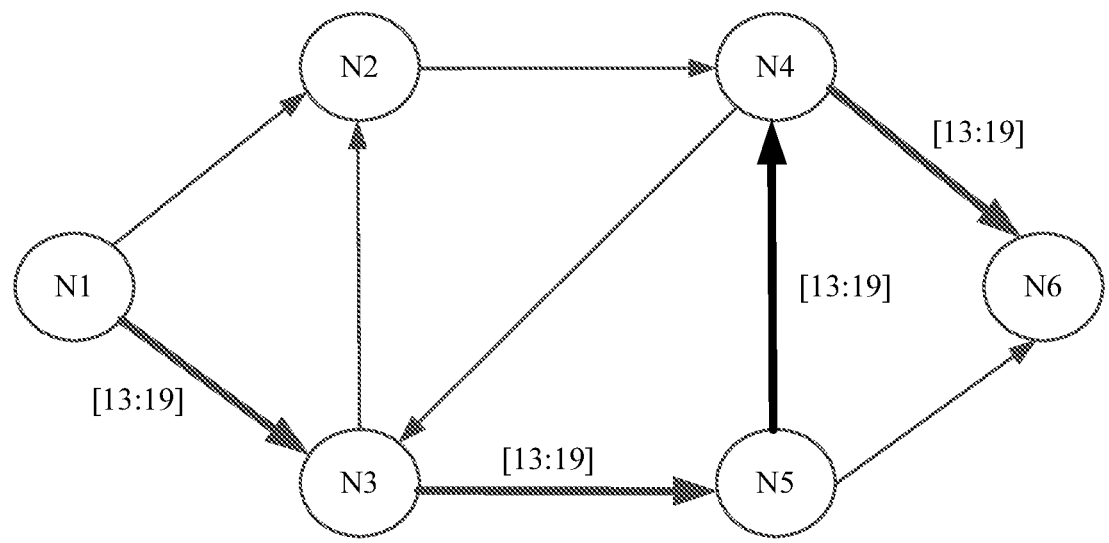

As shown in FIG. 3D, an established maximum flow path is N1→N3→N5→N4→N6, and a wavelength range of optical signals that can be transmitted is the wavelength 13 to a wavelength 19.

Figure 3E:
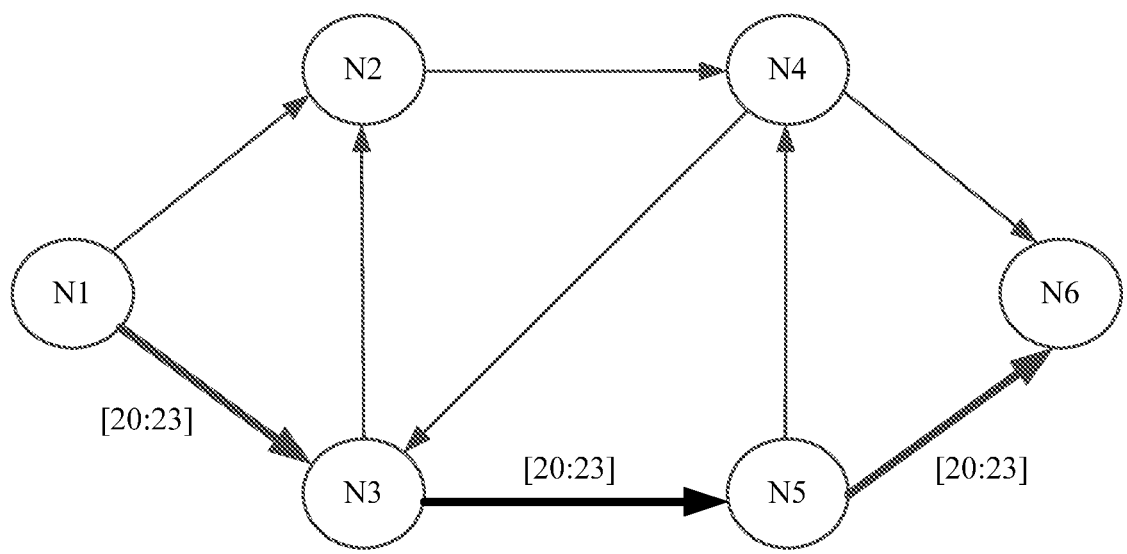

As shown in FIG. 3E, an established maximum flow path is N1→N3→N5→N6, and a wavelength range of optical signals that can be transmitted is a wavelength 20 to a wavelength 23.

It should be noted that, when the network element creates the optical signal group, an optical signal in the optical signal group may be an optical signal that bears a service, or may be an optical signal that bears no service. For example, a dummy light covering a particular wavelength range is created.

Step 202: The network element selects a first optical signal group from the optical signal group based on a preset rule.

After creating the optical signal group, the network element may select some optical signals from the optical signal group as the first optical signal group, or may directly use the optical signal group as the first optical signal group. The network element may select one first optical signal group, or may select a plurality of first optical signal groups.

After creating the optical signal group, the network element further needs to perform further selection. Therefore, the first optical signal group can be more flexibly obtained. The first model that is established based on the first data of the first optical signal group can be applied to various scenarios, such that higher accuracy can be achieved when the parameter such as the OSNR of the optical signal is calculated based on the first model.

There are many selection manners. Three manners are listed below.

First manner: Multiplexed wavelength optical power of the optical signal group is attenuated. The multiplexed wavelength optical power is a sum of power of the optical signals in the optical signal group. When the network element includes an optical amplifier, the multiplexed wavelength optical power of the optical signal group may be adjusted using the optical amplifier.

For example, the network element may perform first adjustment based on a first attenuation parameter corresponding to the optical signal group, to obtain the first optical signal group. The first adjustment is adjusting, based on the first attenuation parameter, multiplexed wavelength optical power that is obtained before the optical signal group is input into the optical amplifier.

The optical signal group may correspond to one or more first attenuation parameters. For any first attenuation parameter, the network element may perform the first adjustment based on the first attenuation parameter.

In other words, when the optical signal group may correspond to a plurality of first attenuation parameters, one first optical signal group is obtained each time the first adjustment is performed for the optical signal group. Therefore, when the optical signal group corresponds to a plurality of first attenuation parameters, a plurality of first optical signal groups are obtained.

After the optical signal group corresponds to a plurality of first attenuation parameters, a plurality of first optical signal groups can be obtained. During establishment of the first model, a data volume of obtained first data is larger. This can ensure that a finally created first model can cover an optical signal group of various wavelength combinations, and can further ensure that the parameter such as the OSNR of the optical signal can be more accurately obtained through calculation based on the first model.

There are many manners of obtaining the first attenuation parameter corresponding to the optical signal group. For example, when the network element corresponding to the first node or the SDN controller sends an optical signal group creation instruction to each network element on the path obtained through calculation, the optical signal group creation instruction may include the first attenuation parameter corresponding to the optical signal group.

For another example, the first attenuation parameter may be preconfigured in the network element. The first attenuation parameter may be configured based on an attribute of the optical amplifier in the network element. For example, multiplexed wavelength optical power that can be adjusted by the optical amplifier in the network element has a particular window value, and the first attenuation parameter may be configured based on the window value.

The first attenuation parameter can be flexibly obtained in the foregoing manners. Subsequently, the network element may be enabled to obtain the first optical signal group based on the first attenuation parameter. This can further ensure that the first model is successfully created.

Second manner: An optical signal with a specific wavelength is added to or dropped from the optical signal group.

Wavelengths of optical signals that can be transmitted in the network element have a particular range. As shown in FIG. 3A, N1 and N2 can transmit only optical signals with the wavelength 1 to the wavelength 16.

Therefore, after the network element creates the optical signal group, based on an allowable wavelength transmission range of the network element, the network element may add or drop an optical signal with a specific wavelength to or from the optical signal group, or may add some optical signals with specific wavelengths and drop some other optical signals with specific wavelengths.

For example, a wavelength range of a currently created optical signal group is the wavelength 1 to the wavelength 10. If the allowable wavelength transmission range of the network element is the wavelength 1 to the wavelength 16, the network element may add an optical signal with the wavelength 11, or may add optical signals with the wavelength 11 and the wavelength 12. If the allowable wavelength transmission range of the network element is the wavelength 1 to the wavelength 6, the network element may drop optical signals with the wavelength 7 to the wavelength 10, or may drop optical signals with the wavelength 5 and the wavelength 10.

For example, one or more optical signals may be added to or dropped from the optical signal group. This is not limited in this application.

In a possible implementation, after creating the optical signal group, the network element may add an optical signal a plurality of times or may drop an optical signal a plurality of times, each time an optical signal is added, one first optical signal group may be obtained, and each time an optical signal is dropped, one first optical signal group is obtained.

For example, a wavelength range of a currently created optical signal group is the wavelength 1 to the wavelength 10. If the allowable wavelength transmission range of the network element is the wavelength 1 to the wavelength 16, the network element may add an optical signal with the wavelength 11, and a wavelength range of the obtained first optical signal group is the wavelength 1 to the wavelength 11, or the network element may add optical signals with the wavelength 11 and the wavelength 12, and a wavelength range of the obtained first optical signal group is the wavelength 1 to the wavelength 12. After the operation of adding an optical signal is performed twice, two different first optical signal groups may be obtained.

The first optical signal group can be more conveniently obtained by adding or dropping an optical signal with a specific wavelength, and when a plurality of first optical signal groups are obtained, a data volume for creating the first model is increased. This can effectively ensure higher accuracy of the gain and the noise coefficient that are determined using the first model, and is applicable to determining a parameter such as an OSNR of an optical signal in various wavelength combinations.

Third manner: Single-wavelength optical power of any optical signal in the optical signal group is attenuated. The single-wavelength optical power of the any optical signal is optical power of the any optical signal. When the network element includes a ROADM, the single-wavelength optical power of the any optical signal in the optical signal group may be adjusted using the ROADM.

For example, the network element may perform second adjustment based on a second attenuation parameter corresponding to any optical signal in the optical signal group, to obtain the first optical signal group. The second adjustment is adjusting, based on the second attenuation parameter of the optical signal, single-wavelength optical power that is obtained before the optical signal is input into the ROADM.

For any optical signal in the optical signal group, the optical signal may correspond to one or more second attenuation parameters. For any second attenuation parameter, the network element may perform the second adjustment based on the second attenuation parameter.

In other words, when the optical signal may correspond to a plurality of second attenuation parameters, each time the second adjustment is performed for the optical signal, one first optical signal group may be obtained. Because the optical signal corresponds to a plurality of second attenuation parameters, a plurality of first optical signal groups can be obtained.

After the optical signal corresponds to a plurality of second attenuation parameters, a plurality of first optical signal groups can be obtained. During establishment of the first model, a data volume of obtained first data is larger. This can ensure that a finally established first model can cover an optical signal group of various wavelength combinations and the first model is more accurate, and can further ensure that the parameter such as the OSNR of the optical signal can be more accurately obtained through calculation based on the first model.

There are many manners of obtaining the second attenuation parameter corresponding to the optical signal group. For example, when the network element corresponding to the first node or the SDN controller sends an optical signal group creation instruction to each network element on the path, the optical signal group creation instruction may include the second attenuation parameter corresponding to any optical signal in the optical signal group.

For another example, the second attenuation parameter may be preconfigured in the network element. The second attenuation parameter may be configured based on an attribute of the ROADM in the network element. For example, single-wavelength optical power that can be adjusted by the ROADM in the network element has a particular window value, and the second attenuation parameter may be configured based on the window value.

The second attenuation parameter can be flexibly obtained in different application scenarios in the foregoing manners. Subsequently, the network element may be enabled to obtain the first optical signal group using the second attenuation parameter. This can ensure that the first model is successfully established.

It should be noted that, during the second adjustment, only one optical signal in the optical signal group may be adjusted, or some optical signals in the optical signal group may be adjusted, or all optical signals in the optical signal group may be adjusted.

In the optical signal group, second attenuation parameters corresponding to different optical signals may be different, and there may be one or more corresponding second attenuation parameters. This is not limited in this application. When the network element performs the second adjustment, a plurality of first optical signal groups may be obtained through different combinations of optical signals that need to be adjusted, such that the first model can be created. Alternatively, different combinations may be obtained from a plurality of second attenuation parameters corresponding to optical signals that need to be adjusted, to obtain a plurality of first optical signal groups.

For example, the optical signal group includes an optical signal 1, an optical signal 2, an optical signal 3, an optical signal 4, and an optical signal 5. Each optical signal in the optical signal group corresponds to one second attenuation parameter. During the second adjustment, the network element may perform the second adjustment on each optical signal in the optical signal group based on the second attenuation parameter corresponding to each optical signal in the optical signal group, to obtain the first optical signal group; or the network element may perform the second adjustment on the optical signal 1 and the optical signal 2 respectively based on second attenuation parameters corresponding to the optical signal 1 and the optical signal 2 in the optical signal group, to obtain the first optical signal group.

For another example, the optical signal group includes an optical signal 1, an optical signal 2, an optical signal 3, an optical signal 4, and an optical signal 5. The optical signal 1 corresponds to a second attenuation parameter A and a second attenuation parameter B. The optical signal 2 corresponds to a second attenuation parameter C and a second attenuation parameter D. During the second adjustment, the network element may perform the second adjustment on the optical signal 1 based on the second attenuation parameter A corresponding to the optical signal 1, and perform the second adjustment on the optical signal 2 based on the second attenuation parameter C corresponding to the optical signal 2, to obtain the first optical signal group; or the network element may perform the second adjustment on the optical signal 1 based on the second attenuation parameter B corresponding to the optical signal 1, and perform the second adjustment on the optical signal 2 based on the second attenuation parameter C corresponding to the optical signal 2, to obtain the first optical signal group.

The foregoing three manners of selecting the first optical signal group are merely examples for description. This embodiment of this application is not limited to the three manners, and another manner may alternatively be used. In addition, the three manners may be performed separately or jointly. For example, the network element may obtain the first optical signal group in the first manner and the third manner jointly. In other words, the network element may adjust the multiplexed wavelength optical power of the optical signal group, or may adjust a single-wavelength optical signal power of any signal in the optical signal group. An adjustment order may be determined based on a structure of the network element. For example, when the structure of the network element is a structure of the network element 120 shown in FIG. 1, because the ROADM is closer to an optical signal input end than the OA, the second adjustment needs to be performed before the first adjustment. For another example, when the structure of the network element is a structure of the network element 130 shown in FIG. 1, because the OA is closer to an optical signal input end than the ROADM, the first adjustment needs to be performed before the second adjustment.

It should be understood that, in this embodiment of this application, the first model finally needs to be established based on the first data of the first optical signal group. To ensure that the created first model can be applied to scenarios of optical signals of various wavelength combinations during model establishment, a plurality of different first optical signal groups may be selected as many as possible.

Step 203: The network element obtains first data of the first optical signal group, where the first data includes input optical power and an input optical signal-to-noise ratio of each optical signal that are obtained before the first optical signal group is input into the network element and output optical power and an output optical signal-to-noise ratio of each optical signal that are obtained after the first optical signal group passes through the network element.

After the network element obtains the first optical signal group, the first optical signal group may pass through each component in the network element. The network element obtains, before the first optical signal group enters the network element, the input optical power and the input optical signal-to-noise ratio of each optical signal that are obtained before the first optical signal group is input into the network element, and obtains, at an output end of the network element, the output optical power and the output optical signal-to-noise ratio of each optical signal that are obtained after the first optical signal group passes through the network element.

For example, the network element may include only an optical amplifier. In this case, the first data includes input optical power and an input optical signal-to-noise ratio of each optical signal that are obtained before the first optical signal group is input into the optical amplifier in the network element and output optical power and an output optical signal-to-noise ratio of each optical signal that are obtained after the first optical signal group passes through the optical amplifier in the network element. If there is more than one optical amplifier, a first optical amplifier in the network element is an optical amplifier close to a signal input end of the network element, and a last optical amplifier in the network element is an optical amplifier close to a signal output end of the network element, the first data includes input optical power and an input optical signal-to-noise ratio of each optical signal that are obtained before the first optical signal group is input into the first optical amplifier of the network element and output optical power and an output optical signal-to-noise ratio of each optical signal that are obtained after the first optical signal group passes through the last optical amplifier of the network element.

If the network element may include only a ROADM, the first data includes input optical power and an input optical signal-to-noise ratio of each optical signal that are obtained before the first optical signal group is input into the ROADM in the network element and output optical power and an output optical signal-to-noise ratio of each optical signal that are obtained after the first optical signal group passes through the ROADM in the network element. If there is more than one ROADM, a first ROADM in the network element is a ROADM close to a signal input end of the network element, and a last ROADM in the network element is a ROADM close to a signal output end of the network element, the first data includes input optical power and an input optical signal-to-noise ratio of each optical signal that are obtained before the first optical signal group is input into the first ROADM of the network element and output optical power and an output optical signal-to-noise ratio of each optical signal that are obtained after the first optical signal group passes through the last ROADM of the network element.

If the network element includes an optical amplifier and a ROADM, the optical amplifier is close to a signal input end of the network element, and the ROADM is close to a signal output end of the network element, the first data includes input optical power and an input optical signal-to-noise ratio of each optical signal that are obtained before the first optical signal group is input into the optical amplifier in the network element and output optical power and an output optical signal-to-noise ratio of each optical signal that are obtained after the first optical signal group passes through the ROADM in the network element.

The three network elements shown in FIG. 1 are used as an example to describe a method for obtaining the first data of the first optical signal group by the network element.

The network element 110 includes the OA 113. Therefore, the network element 110 may use optical power and an optical signal-to-noise ratio of each optical signal in a multiplexed signal that are obtained before the multiplexed signal is input into the OA 113 and that are obtained by the sensor 114 as input optical power and an input optical signal-to-noise ratio of each optical signal in the first optical signal group that are obtained before the first optical signal group is input into the network element 110, and use optical power and an optical signal-to-noise ratio of each optical signal in a multiplexed signal that are obtained after the multiplexed signal passes through the OA 113 and that are obtained by the sensor 115 as output optical power and an output optical signal-to-noise ratio of each optical signal that are obtained after the first optical signal group passes through the network element 110.

The network element 120 includes the ROADM 121 and the OA 122, and the ROADM 121 is closer to a signal input end than the OA 122. In this case, the network element 120 may use the optical power and the optical signal-to-noise ratio of each optical signal in the multiplexed signal that are obtained after the multiplexed signal passes through the OA 113 and that are obtained by the sensor 115 as input optical power and an input optical signal-to-noise ratio of each optical signal that are obtained before the first optical signal group is input into the network element 120, and use optical power and an optical signal-to-noise ratio of each optical signal in a multiplexed signal that are obtained after the multiplexed signal passes through the OA 122 and that are obtained by the sensor 124 as output optical power and an output optical signal-to-noise ratio of each optical signal that are obtained after the first optical signal group passes through the network element 120.

The network element 130 includes the OA 131 and the ROADM 132, and the OA 131 is closer to a signal input end than the ROADM 132. In this case, the network element 130 may use the optical power and the optical signal-to-noise ratio of each optical signal in the multiplexed signal that are obtained after the multiplexed signal passes through the OA 122 and that are obtained by the sensor 124 as input optical power and an input optical signal-to-noise ratio of each optical signal that are obtained before the first optical signal group is input into the network element 130, and use optical power and an optical signal-to-noise ratio of each optical signal in a multiplexed signal that are obtained after the multiplexed signal passes through the ROADM 132 and that are obtained by the sensor 136 as output optical power and an output optical signal-to-noise ratio of each optical signal that are obtained after the first optical signal group passes through the network element 130.

Optionally, after obtaining the first data of the first optical signal group, the network element may further filter the first data of the first optical signal group, to select effective data from the first data of the first optical signal group, for establishing the first model.

A filtering principle may be set based on a specific application scenario. This is not limited in this embodiment of this application. For example, the filtering principle may be that output optical power of an optical signal is greater than input optical power of the optical signal. For another example, the filtering principle may be that a difference between a ratio of output optical power of an optical signal to input optical power of the optical signal and a preset gain of an OA falls within 30%.

Step 204: The network element establishes a first model for the network element based on the first data of the first optical signal group, where the first model is used to determine a noise coefficient and a gain that are obtained after the optical signal passes through the network element.

The noise coefficient is used to represent a degree of noise introduced after the optical signal passes through the network element. In this embodiment of this application, that the noise coefficient is an NF is used as an example for description. This is not limited this embodiment of this application, and another parameter may be used as the noise coefficient.

The gain is used to represent a degree of a service power change introduced after the optical signal passes through the network element. In this embodiment of this application, that the gain is a Gain is used as an example for description. This is not limited this embodiment of this application, and another parameter may be used as the gain.

For example, the network element establishes a second model based on the first data of the first optical signal group and based on a preset learning algorithm. The second model is used to determine, based on input optical power and an input optical signal-to-noise ratio of an optical signal that are obtained before the optical signal is input into the optical amplifier in the network element, output optical power and an output optical signal-to-noise ratio that are obtained after the optical signal passes through the network element.

In other words, the network element may use input optical power and an input optical signal-to-noise ratio of each optical signal that are obtained before the optical signal group is input into the optical amplifier as an input value of a model, use output optical power and an output optical signal-to-noise ratio of each optical signal that are obtained after the optical signal group passes through the optical amplifier as an output value of the model, and subsequently, establish the second model based on the preset learning algorithm.

The network element converts an output value of the second model based on a first relationship and a second relationship, to obtain the first model. The first relationship is a relationship between input optical power that is obtained before the optical signal is input into the network element and output optical power and a gain that are obtained after the optical signal passes through the network element. The second relationship is a relationship between an input optical signal-to-noise ratio that is obtained before the optical signal is input into the network element and an output optical signal-to-noise ratio and a noise coefficient that are obtained after the optical signal passes through the network element.

There are many preset learning algorithms. For example, the preset learning algorithm may be a deep learning (DL) algorithm, or may be random forest (RF), or may be Bayesian program learning (BPL) based on small samples, or may be a combination of the foregoing algorithms. The preset learning algorithm is not limited in this embodiment of this application. Any learning algorithm that can be used to create the second model is applicable to this embodiment of this application.

The model (the first model or the second model) in this embodiment of this application may be a neural network model, where both an input and an output in the neural network model are tensors, or may be a conventional machine learning model, where an input and an output of the conventional machine learning model not only include tensors but also include data structures such as a sequence and a dictionary.

Figure 4:
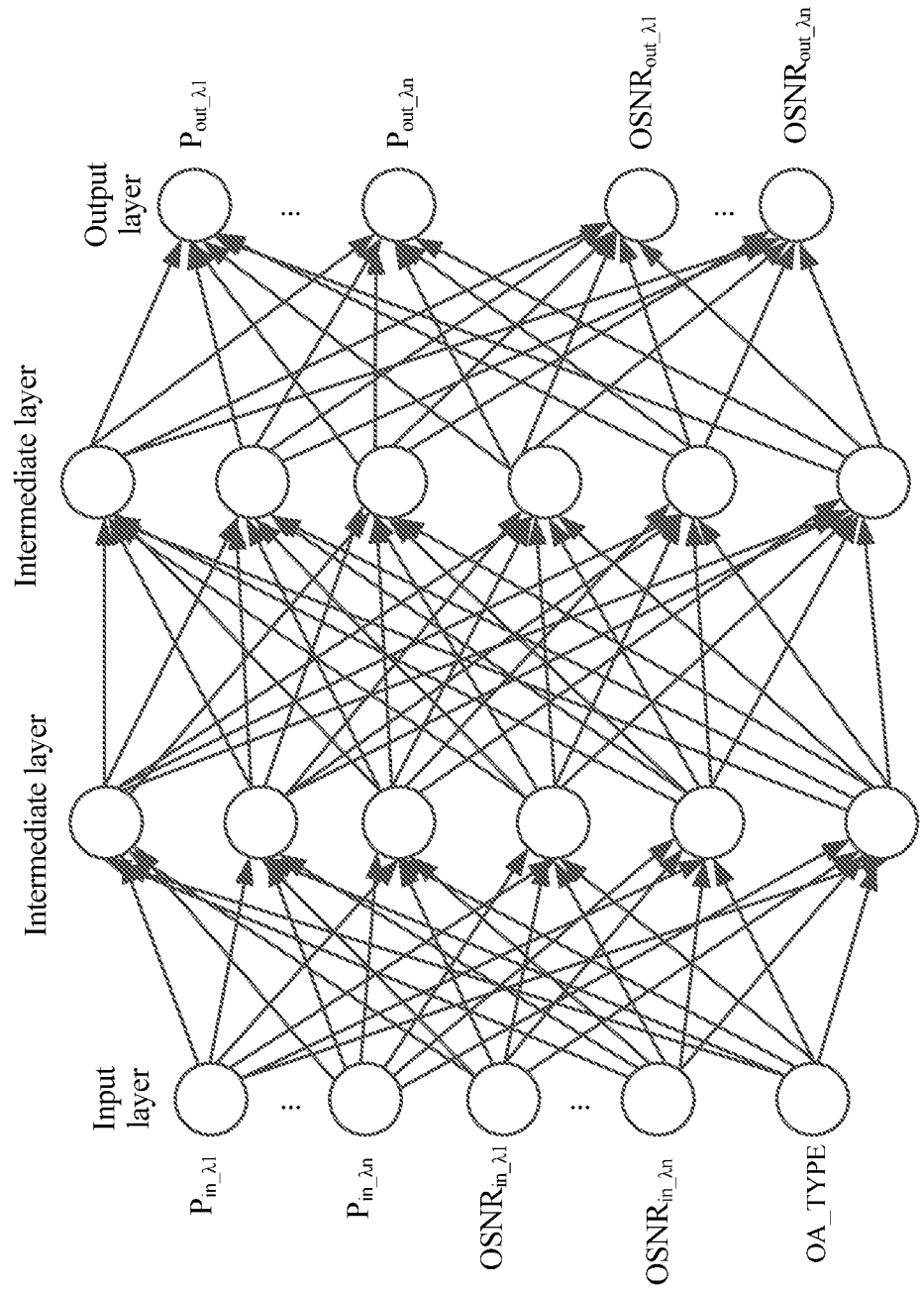
FIG. 4 is a schematic structural diagram of a second model according to an embodiment of this application.

The method for creating the first model is described below using an example in which the preset learning algorithm is deep learning and the model is a neural network model. First, the first data of the first optical signal group may be divided into two groups, where one group is a training set and the other group is a test set. As shown in FIG. 4, input optical power $P_{in\_\lambda_1}$, $P_{in\_\lambda_2}$ ... $P_{in\_\lambda_n}$ of optical signals with wavelengths in the first optical signal group and input optical signal-to-noise ratios $OSNR_{in\_\lambda_1}$, $OSNR_{in\_\lambda_2}$ ... $OSNR_{in\_\lambda_n}$ are used as input values, output optical power $P_{out\_\lambda_1}$, $P_{out\_\lambda_2}$ ... $P_{out\_\lambda_n}$ of the optical signals with the wavelengths in the first optical signal group and output optical signal-to-noise ratios $OSNR_{out\_\lambda_1}$, $OSNR_{out\_\lambda_2}$ ... $OSNR_{out\_\lambda_n}$ are used as output values, and a structure and an edge-weight value of the neural network model are obtained through training using a back propagation algorithm. In this case, the neural network model obtained through training is the second model. Subsequently, advantages and disadvantages of the second model are verified using data in the test set, to perform corresponding adjustment, such that the second model is optimal.

Subsequently, the output value of the second model may be converted according to the following formulas, to obtain the first model. The following formulas can be used in a process of calculating a gain and an NF for an optical signal with a wavelength.

$$P_{in} = P'_{in} + P'_{in_{noise}} \quad (1)$$

$$OSNR_{in} = 10\log_{10}(P'_{in}/P'_{in\_noise}) \quad (2)$$

$$P'_{in} = \frac{P_{in}}{\frac{1}{1e + (OSNR_{in}/10)} + 1} \quad (3)$$

$$P_{out} = P'_{out} + P'_{out\_noise} \quad (4)$$

$$OSNR_{out} = 10\log_{10}(P'_{out}/P'_{out\_noise}) \quad (5)$$

$$P'_{out} = \frac{P_{out}}{\frac{1}{1e + (OSNR_{out}/10)} + 1} \quad (6)$$

$$Gain_\lambda = P'_{out}/P'_{in} \quad (7)$$

$$NF_\lambda = 10\log_{10}\left(\frac{OSNR_{in}}{OSNR_{out}}\right) \quad (8)$$

After the optical signal with the wavelength is input into the network element, noise is introduced into a transmission process of the optical signal with the wavelength. In this case, input optical power of the optical signal with the wavelength is divided into two parts: one part is effective input optical power, and the other part is input power of the introduced noise. It can be learned from the formula (1) that, $P_{in}$ is input optical power that is obtained before the optical signal with the wavelength is input into the network element. The input optical power $P_{in}$ is equal to a sum of the effective input optical power $P'_{in}$ of the optical signal with the wavelength and the input power $P'_{in_{noise}}$ of the introduced noise. In the formula (2), an input optical signal-to-noise ratio $OSNR_{in}$ that is obtained before the optical signal with the wavelength is input into the network element is related to a ratio of the effective input optical power $P'_{in}$ of the optical signal with the wavelength to the input power $P'_{in_{noise}}$ of the introduced noise. Based on the formula (1) and the formula (2), the formula (3) may be obtained, and the effective input optical power $P'_{in}$ of the optical signal with the wavelength may be obtained through calculation.

After the optical signal with the wavelength passes through the network element, the optical signal with the wavelength is amplified in the network element, and the noise carried by the optical signal with the wavelength is also processed. Therefore, output optical power of the optical signal with the wavelength is divided into two parts: one part is effective output optical power, and the other part is output power of the introduced noise. It can be learned from the formula (4) that, $P_{out}$ is output optical power that is obtained after the optical signal with the wavelength passes through the network element. The output optical power $P_{out}$ is equal to a sum of the effective output optical power $P'_{out}$ of the optical signal with the wavelength and the output power $P'_{out\_noise}$ of the introduced noise. In the formula (5), a ratio of the effective output optical power $P'_{out}$ of the optical signal with the wavelength to the output power $P'_{out\_noise}$ of the introduced noise is related to an output optical signal-to-noise ratio $OSNR_{out}$ that is obtained after the optical signal with the wavelength passes through the network element. Based on the formula (4) and the formula (5), the formula (6) may be obtained, and the effective output optical power $P'_{out}$ of the optical signal with the wavelength may be obtained through calculation.

A gain $gain_\lambda$ of the optical signal with the wavelength may be obtained through calculation based on the formula (7), and $gain_\lambda$ is equal to a ratio of the effective output optical power $P'_{out}$ of the optical signal with the wavelength to the effective input optical power $P'_{in}$ of the optical signal with the wavelength. The formula (3) and the formula (6) are substituted into the formula (7), and $gain_\lambda$ of the optical signal with the wavelength can be obtained through calculation based on the input optical power $P_{in}$ and the input optical signal-to-noise ratio $OSNR_{in}$ that are obtained before the optical signal with the wavelength is input into the network element and the output optical power $P_{out}$ and the output optical signal-to-noise ratio $OSNR_{out}$ that are obtained after the optical signal with the wavelength passes through the network element.

$NF_\lambda$ of the optical signal with the wavelength may be obtained through calculation based on the formula (8). A ratio of the input optical signal-to-noise ratio $OSNR_{in}$ that is obtained before the optical signal with the wavelength is input into the network element to the output optical signal-to-noise ratio $OSNR_{out}$ that is obtained after the optical signal with the wavelength passes through the network element is related to the noise coefficient $NF_\lambda$ of the optical signal with the wavelength.

A gain and an NF of any optical signal in the first optical signal group may be obtained through calculation based on the formula (1) to the formula (8) and based on input optical power $P_{in}$ and an input optical signal-to-noise ratio $OSNR_{in}$ that are obtained before the any optical signal in the first optical signal group is input into the network element and output optical power $P_{out}$ and an output optical signal-to-noise ratio $OSNR_{out}$ that are obtained after the any optical signal in the first optical signal group passes through the network element.

Optionally, during establishment of the second model, to enable the established second model to more accurately reflect an attribute of the network element, an input value of the second model may further be increased. For example, the input value of the second model may further include a type of the optical amplifier in the network element, for example, OA TYPE. The OA TYPE may be a quantized value, or may be a value preset based on a different OA type.

Optionally, if the network element further includes the ROADM, because the ROADM causes a frequency offset of an optical signal in the first optical signal group, a frequency offset of the ROADM may be considered during calculation of the first model.

The frequency offset of the ROADM is a difference between an actual center frequency of the optical signal and a standard wavelength center frequency defined in G.694.1/G.694.2.

For example, the network element may first obtain second data of the first optical signal group. The second data includes an optical spectrum that is obtained before the first optical signal group is input into the ROADM and an optical spectrum that is obtained after the first optical signal group passes through the ROADM.

Based on the optical spectrum that is obtained before the first optical signal group is input into the ROADM and the optical spectrum that is obtained after the first optical signal group passes through the ROADM, a frequency offset of each optical signal in the first optical signal group is determined by comparison. Subsequently, the network element may determine the frequency offset of the ROADM based on the second data of the first optical signal group.

In a possible implementation, the frequency offset of the ROADM may alternatively be used as an input value of the first model, such that impact of the frequency offset of the ROADM on a gain and a noise coefficient of an optical signal can be considered when the gain and the noise coefficient of the optical signal are determined using the first model, and the gain and the noise coefficient that are determined based on the first model are more accurate.

After establishing the first model for the network element based on the first data of the first optical signal group, the network element may further adjust the first model in real time.

The network element may update the first optical signal group, for example, adjust a wavelength combination of an optical signal in the first optical signal group, or may adjust the multiplexed wavelength optical power of the first optical signal group, or may adjust single-wavelength optical power of any optical signal in the first optical signal group. The foregoing manners of updating the first optical signal group are all examples. Any manner that can be used to update the first optical signal group is applicable to this embodiment of this application. Actually, the network element may alternatively not update the first optical signal group. After the components in the network element operate for a period of time, particular optical damage is introduced. When the first optical signal group passes through the network element again, the first data of the first optical signal group is also updated. Regardless of whether the first optical signal group is updated, the first data of the first optical signal group is updated to some extent.

The network element obtains the updated first data of the first optical signal group, and subsequently, may adjust the second model based on the updated first data of the first optical signal group, and update the first model based on the adjusted second model.

After the first data of the first optical signal group is updated, an input value and an output value of the second model need to be adjusted. Correspondingly, the first model also needs to be further updated based on the adjusted second model.

Table 1 shows two possible types of the first model: one type is a neural network model, and the other type is a conventional machine learning model. Each type of model includes three parts: a graph, an operation set, and a basic data type.

The graph is used to describe a parametric graph used to execute the model. The operation set is used to indicate a set of operations performed when the model is run. Both an input value and an output value of the neural network model are tensor. An input and an output of the conventional machine learning model not only include tensors but also include sequences and mappings.

TABLE 1

| Name | Type | | Description |
|---|---|---|---|
| | Neural network model | Conventional machine learning model | |
| Graph | Graph | Graph | Parametric graph used when the model is executed |
| Operation set | Operation set | Operation set | Set of operations when the model is run |
| Basic data type | Both an input and an output are tensors. | An input and an output include tensors, sequences, and mappings. | A difference between the neural network model and the conventional machine learning model lies in a type of input/output data. |

Table 2 shows a structure of the graph in the first model. The graph includes a node, an input initial default value (initializer), an input value (input), and an output value (output). An edge of the graph includes an input value and an output value included in the node.

The initializer of the graph is a default initial value that is input into the model, and may be manually set. The input of the graph is input data of the model. For example, the input of the graph may be input optical power and an input optical signal-to-noise ratio of each optical signal in any optical signal group that are obtained before the optical signal is input into the network element and that are obtained by the network element. The output of the graph is output data of the model. For example, the output of the graph may be a gain and an NF that are obtained after each optical signal in the any optical signal group passes through the network element.

TABLE 2

| Name | Type | Description |
|---|---|---|
| name | String | Name of the graph of the model |
| nodes | Node[ ] | List of nodes that can form an ordered computational graph based on input or output data. An output of an upstream node and an input of a downstream node may form an edge. |
| initializer | Tensor[ ] | Default initial value that is input into the model |
| input | ValueInfo[ ] | Input data of the model. If no external input is available, an initial value of the initializer is used by default. |
| output | ValueInfo[ ] | Output of the model. A set of data is input, and output data is obtained through calculation based on the model. |

Table 3 shows a structure of the node in the graph shown in Table 2. The node includes an input value (input) of the node, an output value (output), a symbol identifier (op_type) of the node, and an attribute of the node.

The attribute of the node is used to indicate a weight value of an edge. The input of the node indicates an input into the node. For example, the input of the node may be input optical power or an input optical signal-to-noise ratio that is obtained before an optical signal in any optical signal group is input into the network element. The output of the node indicates an output from the node. For example, the output of the node may be a gain or an NF that is obtained after an optical signal in the any optical signal group passes through the network element. The symbol identifier of the node is used to indicate a neuron or a group of neurons in a neural network.

TABLE 3

| Name | Type | Description |
|---|---|---|
| name | string | Node name |
| input | string[ ] | Input value name of the node and an input value of a node operator. It should be referenced from the input of the graph or the output of the node. |
| output | string[ ] | Output value name of the node and an output value of the node operator. It is an intermediate calculation result of the graph or the output of the graph. |
| op_type | string | Symbol identifier when the operator is invoked |
| attribute | Attribute[ ] | An attribute of the input value or the output value of the node, for identifying an attribute of the edge in the graph |

After establishing the first model, or updating the first model, the network element sends information about the first model to the other network element or the SDN controller.

It can be learned from the process of establishing the first model that, the first model relates to the second model, the second model may be used to determine the output optical power and the output optical signal-to-noise ratio of the optical signal, and the first model may be used to determine the gain and the noise coefficient of the optical signal.

When sending the information about the first model to the other network element or the SDN controller, the network element may send all information about the first model to the other network element or the SDN controller, or may send some information about the first model to the other network element or the SDN controller.

During application, the first model may be converted into a plurality of different functions. For example, the first model may include some or all of the following: a function for determining the gain of the optical signal, a function for determining the noise coefficient of the optical signal, a function for determining the output optical power of the optical signal, and a function for determining the output optical signal-to-noise ratio of the optical signal.

The network element may send information about some or all of the foregoing functions to the other network element or the SDN controller.

For the network elements in the optical network system, compositions of some network elements and attributes of components included in the network elements are the same. For example, attributes of the optical amplifiers are the same, or attributes of the ROADMs are the same. First models of the network elements may be universal. After a network element establishes a first model, the network element may first share the established first model with another network element. In this way, an operation of establishing the first model by the other network element is omitted, such that the other network element can more efficiently determine a gain and a noise coefficient of an optical signal.

In the foregoing description, that the first model may be converted into a plurality of different functions is used only as an example. Actually, a type of the information about the first model is not limited in this embodiment of this application. Any information that can represent the first model is applicable to this embodiment of this application.

The optical network system shown in FIG. 1 is used an as an example. The network element 120 may obtain a first model of the network element 120 through calculation based on data collected by the sensor. The network element 130 may obtain a first model of the network element 130 through calculation based on data collected by the sensor. Subsequently, the network element 120 may send information about the first model of the network element 120 to the network element 110, and the network element 130 may send information about the first model of the network element 130 to the network element 110. After the network element 110 receives the first model of the network element 120 and the first model of the network element 130, with reference to a first model of the network element 110 that is established by the network element 110, the network element 110 may determine an OSNR in the optical network system of any optical signal that is input into the optical network system. For example, the network element may determine the OSNR according to the following formula:

$$OSNR = 58 - 10 \text{Log}\left(\sum_i^N \frac{L_i NF_i}{P_i^{in}}\right).$$

The first model of each network element is established based on the first data of the first optical signal group, and impact on a parameter such as the OSNR of the optical signal with the specific wavelength in different wavelength combinations is considered. Therefore, a parameter such as an OSNR of any optical signal that is input into the optical network system is finally obtained through calculation.

It should be understood that, that the network element establishes the first model is used as an example for description in this embodiment of this application. During actual application, the network element may alternatively send the data obtained by the sensor in the network element to another device, for example, to the SDN controller, and the SDN controller establishes the first model based on the first data of the first optical signal group. The methods are the same and only execution bodies are different. Therefore, for details, refer to the foregoing descriptions. Details are not described herein again.

Figure 5:
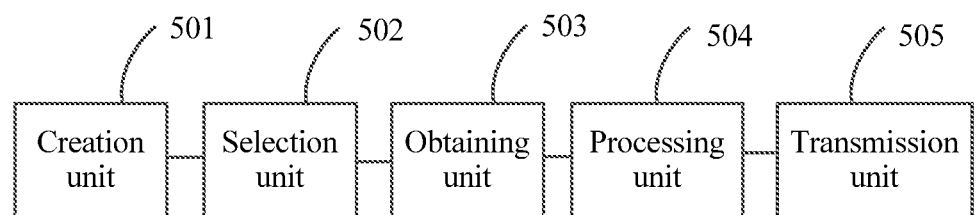
FIG. 5 is a structural diagram of an apparatus according to an embodiment of this application.

Based on a same concept as the method embodiment, an embodiment of this application further provides an apparatus, configured to perform the method performed by the network element in the method embodiment. For related features, refer to the method embodiment. Details are not described herein again. As shown in FIG. 5, the apparatus includes a creation unit 501, a selection unit 502, an obtaining unit 503, and a processing unit 504.

The creation unit 501 is configured to create an optical signal group, where the optical signal group includes an optical signal with at least one wavelength.

The selection unit 502 is configured to select a first optical signal group from the optical signal group based on a preset rule.

The obtaining unit 503 is configured to obtain first data of the first optical signal group, where the first data includes input optical power and an input optical signal-to-noise ratio of each optical signal that are obtained before the first optical signal group is input into the network element and output optical power and an output optical signal-to-noise ratio of each optical signal that are obtained after the first optical signal group passes through the network element.

The processing unit 504 is configured to establish a first model for the network element based on the first data of the first optical signal group, where the first model is used to determine a noise coefficient and a gain that are obtained after the optical signal passes through the network element.

For example, the selection unit 502 may select the first optical signal group in the following three manners.

Manner 1: The first optical signal group is obtained by adjusting multiplexed wavelength optical power of the optical signal group.

When the apparatus includes an optical amplifier, the selection unit 502 may adjust the multiplexed wavelength optical power of the optical signal group using the optical amplifier. When selecting the first optical signal group from the optical signal group based on the preset rule, the selection unit 502 may perform first adjustment based on a first attenuation parameter corresponding to the optical signal group, to obtain the first optical signal group.

The first adjustment is adjusting, based on the first attenuation parameter, multiplexed wavelength optical power that is obtained before the optical signal group is input into the optical amplifier.

Manner 2: The first optical signal group is obtained by adding or dropping an optical signal to or from the optical signal group.

The selection unit 502 may add an optical signal with a specific wavelength to the optical signal group, to obtain the first optical signal group. Alternatively, the selection unit 502 may drop an optical signal with a specific wavelength from the optical signal group, to obtain the first optical signal group.

Manner 3: The first optical signal group is obtained by adjusting single-wavelength optical power of any optical signal in the optical signal group.

When the apparatus includes a ROADM, the ROADM may be connected to the optical amplifier, and the selection unit 502 may perform second adjustment based on a second attenuation parameter corresponding to any optical signal in the first optical signal group.

The second adjustment is adjusting, based on the second attenuation parameter of the optical signal, single-wavelength optical power that is obtained before the optical signal is input into the ROADM.

The foregoing three manners are merely examples for description. The first optical signal group may be obtained in another manner. This is not limited in this application. In addition, the three manners may be used jointly or separately.

In a possible implementation, when the network element includes the ROADM, a frequency offset of the ROADM needs to be determined.

For example, the obtaining unit 503 first obtains second data of the first optical signal group. The second data includes an optical spectrum that is obtained before the first optical signal group is input into the ROADM and an optical spectrum that is obtained after the first optical signal group passes through the ROADM. Subsequently, the processing unit 504 determines the frequency offset of the ROADM based on the second data of the first optical signal group.

When the processing unit 504 establishes the first model for the network element based on the first data of the first optical signal group, the following manner may be used:

First, a second model is established based on the first data of the first optical signal group and based on a preset learning algorithm. The second model is used to determine output optical power and an output optical signal-to-noise ratio that are obtained after the optical signal passes through the network element.

Subsequently, an output value of the second model is converted based on a first relationship and a second relationship, to obtain the first model. The first relationship is a relationship between input optical power that is obtained before the optical signal is input into the network element and the output optical power and the gain that are obtained after the optical signal passes through the network element. The second relationship is a relationship between an input optical signal-to-noise ratio that is obtained before the optical signal is input into the network element and the output optical signal-to-noise ratio and the noise coefficient that are obtained after the optical signal passes through the network element.

To maintain accuracy of the first model, after the processing unit 504 establishes the first model for the network element based on the first data of the first optical signal group, the obtaining unit 503 updates the first model in real time.

For example, the obtaining unit 503 may first obtain updated first data of the first optical signal group. Subsequently, the processing unit 504 adjusts the second model based on the updated first data of the first optical signal group, and updates the first model based on the adjusted second model.

In a possible implementation, the apparatus may further include a transmission unit 505, and the transmission unit 505 may send information about the first model to another network element or an SDN controller.

Unit division in the embodiments of this application is an example, is only logical function division, and may be other division in an actual implementation. In addition, functional units in the embodiments of this application may be integrated in one processor, or may exist alone physically, or two or more units are integrated into one module. The foregoing integrated unit may be implemented in a form of hardware, or may be implemented in a form of a software functional module.

If the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a terminal device (which may be a personal computer, a mobile phone, or a network device, or the like) or a processor to perform all or some of the steps of the methods in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

In the embodiments of this application, the network element may be presented in the form of functional modules obtained through division in an integrated manner. The "module" herein may refer to a specific application-specific integrated circuit (ASIC), a circuit, a processor executing one or more software or firmware programs, a memory, an integrated logic circuit, and/or another component that can provide the foregoing function.

Figure 6:
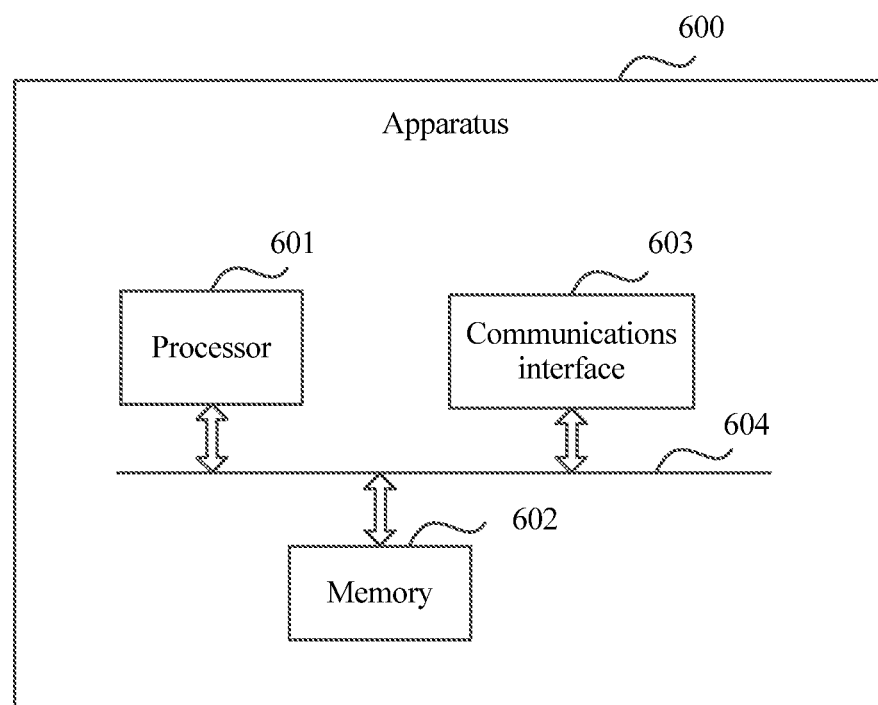
FIG. 6 is a structural diagram of an apparatus according to an embodiment of this application.

In an embodiment, a person skilled in the art can figure out that the network element may be in a form shown in FIG. 6.

An apparatus 600 shown in FIG. 6 includes one or more processors 601 and a memory 602, and optionally, may further include a communications interface 603.

The memory 602 may be a volatile memory such as an RAM. Alternatively, the memory 602 may be a non-volatile memory such as a read-only memory, a flash memory, a hard disk drive (HDD), or a solid-state drive (SSD). Alternatively, the memory 602 is any other medium that can be used to carry or store expected program code in a command or data structure form and that can be accessed by a computer. However, this is not limited. The memory 602 may be a combination of the foregoing memories.

In this embodiment of this application, a specific connection medium between the processor 601 and the memory 602 is not limited. In this embodiment of this application, the memory 602 and the processor 601 are connected using a bus 604 in the figure. The bus 604 is indicated using a bold line in the figure. A manner of connection between other components is merely an example for description, and imposes no limitation. The bus 604 may be classified into an address bus, a data bus, a control bus, and the like. For ease of indication, the bus is indicated using only one bold line in FIG. 6. However, it does not indicate that there is only one bus or only one type of bus.

The processor 601 may have data receiving and sending functions, and can communicate with another device. In the apparatus shown in FIG. 6, an independent data transceiver module may alternatively be disposed. For example, the communications interface 603 is configured to receive and send data. When the processor 601 communicates with another device, data may be transmitted through the communications interface 603.

When the network element is in the form shown in FIG. 6, the processor 601 in FIG. 6 may invoke a computer executable instruction stored in the memory 602, to enable the apparatus to perform the method performed by the network element in any one of the foregoing method embodiments.

For example, the functions/implementation processes of the creation unit, the selection unit, the obtaining unit, and the processing unit in FIG. 5 all may be implemented by the processor 601 in FIG. 6 by invoking the computer executable instruction stored in the memory 602. Alternatively, the function/implementation process of the processing unit in FIG. 5 may be implemented by the processor 601 in FIG. 6 by invoking the computer executable instruction stored in the memory 602, and the function/implementation process of the transmission unit in FIG. 5 may be implemented through the communications interface 603 in FIG. 6.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by the computer or the processor of the other programmable data processing device generate an apparatus for implementing a specific function in one or more processes in the flowcharts and/or in one or more blocks in the block diagrams.

These computer program instructions may be stored in a computer-readable memory that can instruct the computer or the other programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the other programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

A person skilled in the art can make various modifications and variations to the embodiments of this application without departing from the spirit and scope of the embodiments of this application. This application is intended to cover these modifications and variations provided that they fall within the scope of the claims of this application and their equivalent technologies.

What is claimed is:

1. A method for establishing a data model, comprising:
   creating, by a network element, an optical signal group, wherein the optical signal group comprises an optical signal with at least one wavelength;
   adjusting a wavelength quantity of the optical signal group and/or an input optical power of the optical signal group;
   selecting, by the network element based on adjusting the wavelength quantity and/or the input optical power, a first optical signal group from among a plurality of different optical signal groups in the optical signal group;
   obtaining, by the network element, first data of the first optical signal group, wherein the first data comprises a first input optical power and an input optical signal-to-noise ratio of each optical signal that are obtained before the first optical signal group is input into the network element, and wherein the first data further comprises an output optical power and an output optical signal-to-noise ratio of each optical signal that are obtained after the first optical signal group passes through the network element; and
   establishing, by the network element, a first model for the network element based on the first data of the first optical signal group,
   wherein the first model is for the network element to determine a noise coefficient and a gain that are obtained after the optical signal passes through the network element.

2. The method according to claim 1, wherein the network element comprises an optical amplifier, wherein selecting the first optical signal group comprises obtaining the first optical signal group by performing, by the network element, a first adjustment based on a first attenuation parameter corresponding to the optical signal group, and wherein the first adjustment includes adjusting, based on the first attenuation parameter, multiplexed wavelength optical power that is obtained before the optical signal group is input into the optical amplifier.

3. The method according to claim 2, wherein the network element comprises a reconfigurable optical add/drop multiplexer (ROADM) connected to the optical amplifier, wherein before obtaining the first data, the method further comprises performing, by the network element, a second adjustment based on a second attenuation parameter corresponding to any optical signal in the first optical signal group, and wherein the second adjustment includes adjusting, a single-wavelength optical power that is obtained before the optical signal is input into the ROADM.

4. The method according to claim 3, further comprising:
   obtaining, by the network element, second data of the first optical signal group, wherein the second data comprises an optical spectrum that is obtained before the first optical signal group is input into the ROADM and an optical spectrum that is obtained after the first optical signal group passes through the ROADM; and
   determining, by the network element, a frequency offset of the ROADM based on the second data of the first optical signal group.

5. The method according to claim 1, wherein selecting the first optical signal group comprises obtaining the first optical signal group by adding or dropping, by the network element, a second optical signal with a specific wavelength to or from the optical signal group.

6. The method according to claim 1, wherein establishing the first model for the network element comprises:
   establishing, by the network element, a second model based on the first data of the first optical signal group and a preset learning algorithm, wherein the second model is for the network element to determine a second output optical power and a second output optical signal-to-noise ratio that are obtained after the optical signal passes through the network element; and
   obtaining the first model by converting, by the network element, an output value of the second model based on a first relationship and a second relationship, wherein the first relationship is between a second input optical power that is obtained before the optical signal is input into the network element and both the second output optical power and the gain that are obtained after the optical signal passes through the network element, and wherein the second relationship is between an input signal-to-noise ratio that is obtained before the optical signal is input into the network element and both the second output optical signal-to-noise ratio and the noise coefficient that are obtained after the optical signal passes through the network element.

7. The method according to claim 6, wherein after establishing the first model, the method further comprises:

obtaining, by the network element, updated first data of the first optical signal group;

adjusting, by the network element, the second model to generate an adjusted second model based on the updated first data of the first optical signal group; and updating the first model based on the adjusted second model.

8. The method according to claim 1, wherein after establishing the first model, the method comprises sending, by the network element, information about the first model to another network element or a software-defined networking (SDN) controller.

9. An apparatus, comprising:
a memory configured to store instructions; and
a processor coupled to the memory and configured to execute the instructions to cause the apparatus to:
create an optical signal group, wherein the optical signal group comprises an optical signal with at least one wavelength;
adjust a wavelength quantity of the optical signal group and/or an input optical power of the optical signal group;
select, based on adjusting the wavelength quantity and/or the input optical power, a first optical signal group from among a plurality of different optical signal groups in the optical signal group;
obtain first data of the first optical signal group, wherein the first data comprises a first input optical power and an input optical signal-to-noise ratio of each optical signal that are obtained before the first optical signal group is input into a network element, and wherein the first data further comprises an output optical power and an output optical signal-to-noise ratio of each optical signal that are obtained after the first optical signal group passes through the network element; and
establish a first model for the network element based on the first data of the first optical signal group,
wherein the first model is for the apparatus to determine a noise coefficient and a gain that are obtained after the optical signal passes through the network element.

10. The apparatus according to claim 9, wherein the network element comprises an optical amplifier, and wherein the apparatus is configured to obtain the optical signal group by adjusting, based on a first attenuation parameter corresponding to the optical signal group, multiplexed wavelength optical power that is obtained before the optical signal group is input into the optical amplifier.

11. The apparatus according to claim 10, wherein the network element further comprises a reconfigurable optical add/drop multiplexer (ROADM) connected to the optical amplifier, wherein before obtaining the first data, the apparatus is further configured to perform a second adjustment based on a second attenuation parameter corresponding to any optical signal in the first optical signal group, and wherein the second adjustment includes adjusting, based on the second attenuation parameter, a single-wavelength optical power that is obtained before the optical signal is input into the ROADM.

12. The apparatus according to claim 11, wherein the processor is configured to execute the instructions to further cause the apparatus to:
obtain second data of the first optical signal group, wherein the second data comprises an optical spectrum that is obtained before the first optical signal group is input into the ROADM and an optical spectrum that is obtained after the first optical signal group passes through the ROADM; and
determine a frequency offset of the ROADM based on the second data of the first optical signal group.

13. The apparatus according to claim 9, wherein the apparatus is configured to obtain the optical signal group by adding or dropping a second optical signal with a specific wavelength to or from the optical signal group.

14. The apparatus according to claim 9, wherein when establishing the first model for the network element, the apparatus is configured to:
establish a second model based on the first data and a preset learning algorithm, wherein the second model is for the apparatus to determine a second output optical power and a second output optical signal-to-noise ratio that are obtained after the optical signal passes through the network element; and
obtain the first model by converting an output value of the second model based on a first relationship and a second relationship, wherein the first relationship is between a second input optical power that is obtained before the optical signal is input into the network element and both the second output optical power and the gain that are obtained after the optical signal passes through the network element, and wherein the second relationship is between an input signal-to-noise ratio that is obtained before the optical signal is input into the network element and both the second output optical signal-to-noise ratio and the noise coefficient that are obtained after the optical signal passes through the network element.

15. The apparatus according to claim 14, wherein after establishing the first model for the network element, the apparatus is further configured to:
obtain updated first data of the first optical signal group;
adjust the second model to generate an adjusted second model based on the updated first data of the first optical signal group; and
update the first model based on the adjusted second model.

16. The apparatus according to claim 9, further comprising a transmitter configured to send information about the first model to another network element or a software-defined networking (SDN) controller.

17. A method for determining optical signal performance, comprising:
creating, by a network element, an optical signal group, wherein the optical signal group comprises an optical signal with at least one wavelength;
adjusting a wavelength quantity of the optical signal group and/or an input optical power of the optical signal group;
selecting, by the network element based on adjusting the wavelength quantity and/or the input optical power, a first optical signal group from among a plurality of different optical signal groups in the optical signal group;
obtaining, by the network element, first data of the first optical signal group, wherein the first data comprises a first input optical power and an input optical signal-to-noise ratio of each optical signal that are obtained before the first optical signal group is input into the network element, and wherein the first data further comprises an output optical power and an output optical signal-to-noise ratio of each optical signal that are obtained after the first optical signal group passes through the network element;

establishing, by the network element, a data model for the network element based on the first data of the first optical signal group; and using the data model to determine a noise coefficient and/or a gain of the optical signal after the optical signal passes through the network element.

18. The method according to claim 17, wherein the network element comprises an optical amplifier, and wherein selecting the first optical signal group comprises obtaining the first optical signal group by the network element adjusting, based on a first attenuation parameter corresponding to the optical signal group, multiplexed wavelength optical power that is obtained before the optical signal group is input into the optical amplifier.

19. The method according to claim 17, wherein selecting the first optical signal group comprises obtaining the first optical signal group by adding or dropping, by the network element, a second optical signal with a specific wavelength to or from the optical signal group.

20. The method according to claim 19, wherein the network element comprises a reconfigurable optical add/drop multiplexer (ROADM) connected to the optical amplifier, wherein before obtaining the first data of the first optical signal group, the method further comprises performing, by the network element, a second adjustment based on a second attenuation parameter corresponding to any optical signal in the first optical signal group, and wherein the second adjustment includes adjusting, single-wavelength optical power that is obtained before the optical signal is input into the ROADM.

* * * * *